(12) United States Patent
Fukawatase et al.

(10) Patent No.: US 8,215,666 B2
(45) Date of Patent: Jul. 10, 2012

(54) KNEE AIR BAG DEVICE FOR VEHICLE

(75) Inventors: Osamu Fukawatase, Nishikamo-gun (JP); Hitoshi Matsushima, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 234 days.

(21) Appl. No.: 12/678,902

(22) PCT Filed: Sep. 17, 2008

(86) PCT No.: PCT/JP2008/066762
§ 371 (c)(1),
(2), (4) Date: Apr. 26, 2010

(87) PCT Pub. No.: WO2009/038086
PCT Pub. Date: Mar. 26, 2009

(65) Prior Publication Data
US 2010/0237592 A1    Sep. 23, 2010

(30) Foreign Application Priority Data
Sep. 18, 2007 (JP) .................................. 2007-241320

(51) Int. Cl.
*B60R 21/206* (2011.01)
*B60R 21/2165* (2011.01)
(52) U.S. Cl. .................. 280/730.1; 280/728.3
(58) Field of Classification Search ............... 280/730.1, 280/728.3, 732
See application file for complete search history.

(56) References Cited

U.S. PATENT DOCUMENTS
5,082,310 A * 1/1992 Bauer ........................ 280/732
(Continued)

FOREIGN PATENT DOCUMENTS
DE      42 09 604 C2    12/1996
(Continued)

OTHER PUBLICATIONS
International Search Report issued on Nov. 4, 2008 in International Application No. PCT/JP2008/066762 (with translation).

*Primary Examiner* — Drew Brown
(74) *Attorney, Agent, or Firm* — Oliff & Berridge, PLC

(57) ABSTRACT

An air bag door is developed quickly even if the clearance between the grab door outer and the knee of a crew or passenger is narrow when a tier type air bag door is employed in a knee air bag device for vehicle. A fracture portion (50) consisting of a lateral fracture portion (50A) and longitudinal fracture portions (50B, 50C) is formed in the grab door outer general portion (24A). Thus, an air bag door (52) consisting of total six doors, i.e. an upper central air bag door (52A), an upper left side air bag door (52B), an upper right side air bag door (52C), a lower central air bag door (52D), a lower left side air bag door (52E), and a lower right side air bag door (52F), is formed. Even if both knees of the crewman or passenger of a small-sized build are arranged in proximity to or in contact with the lower left side air bag door (52E) and the lower right side air bag door (52F), the lower central air bag door (52D) opens smoothly between both the knees in addition to the upper side air bag doors in the initial stage of development of the air bag door (52).

8 Claims, 10 Drawing Sheets

U.S. PATENT DOCUMENTS

| | | | |
|---|---|---|---|
| 5,084,122 A * | 1/1992 | Fukushima et al. | 156/252 |
| 5,650,115 A * | 7/1997 | Proos et al. | 264/400 |
| 6,092,836 A | 7/2000 | Saslecov | |
| 6,106,003 A * | 8/2000 | Rahmstorf et al. | 280/728.3 |
| 6,276,713 B1 | 8/2001 | Duletzke | |
| 6,550,803 B1 * | 4/2003 | Derrick | 280/728.3 |
| 2003/01326/8 | 7/2003 | Suzuki et al. | |
| 6,705,638 B2 | 3/2004 | Abe et al. | |
| 6,793,238 B2 * | 9/2004 | Schneider et al. | 280/728.3 |
| 6,848,705 B2 * | 2/2005 | Schneider et al. | 280/728.3 |
| 7,261,318 B2 | 8/2007 | Enders | |
| 2002/0175501 A1 * | 11/2002 | Jenkins et al. | 280/728.3 |
| 2003/0189321 A1 * | 10/2003 | Takahashi | 280/728.3 |
| 2005/0046158 A1 | 3/2005 | Abe | |

FOREIGN PATENT DOCUMENTS

| | | |
|---|---|---|
| JP | A-11-512057 | 10/1999 |
| JP | A-2002-29355 | 1/2002 |
| JP | A-2002-356137 | 12/2002 |
| JP | A-2004-9985 | 1/2004 |
| JP | A-2004-503418 | 2/2004 |
| JP | A-2004-106592 | 4/2004 |
| JP | A-2005-67466 | 3/2005 |
| JP | A-2006-347393 | 12/2006 |
| JP | A-2007-153222 | 6/2007 |
| JP | A-2008-174210 | 7/2008 |

* cited by examiner

KNEE AIR BAG DEVICE FOR VEHICLE

TECHNICAL FIELD

The present invention relates to a knee air bag device for a vehicle that, at the time of a collision, expands and unfolds a knee air bag and restrains the knees of a vehicle occupant.

BACKGROUND TECHNOLOGY

In recent years, knee air bag devices for vehicles, that expand and unfold a knee air bag at the time of a collision and restrain the knees of a vehicle occupant, are being installed from the standpoint of improving the vehicle occupant protecting performance at the time of a collision. Examples of this type of knee air bag device for a vehicle are disclosed in following Patent Documents 1, 2. To describe briefly, in the prior art disclosed in these Patent Documents, a knee air bag device is incorporated within the glove compartment door of a glove compartment that is provided at an instrument panel.
Patent Document 1: German Patent No. 4209604
Patent Document 2: U.S. Pat. No. 6,276,713

DISCLOSURE OF THE INVENTION

Problems to be Solved by the Invention

Here, in a case of employing an air bag door structure in which a fracture portion (tear line) is set at the glove compartment door outer of the glove compartment door, and, when the bag expanding pressure of the knee air bag reaches a predetermined value, the glove compartment door outer fractures along the fracture portion and the air bag doors are unfolded, it is thought that it becomes difficult for the air bag doors to open depending on the physique or the like of the vehicle occupant. Namely, particularly in the case of a vehicle occupant of a small build, there is the tendency for it to be easy for the knees to be near the glove compartment door outer, and, in this case, the gap between the glove compartment door outer and the knees of the vehicle occupant becomes quite narrow. Therefore, when the air bag doors unfold, the air bag doors are interfered with by the knees and become difficult to open, and it is expected that time is required until the unfolding operation of the air bag doors is completed. Accordingly, it is preferable to suppose in advance such a case as well, and to devise countermeasures thereto.

In view of the above-described circumstances, an object of the present invention is to provide a knee air bag device for a vehicle that, when tear type air bag doors are employed, can rapidly unfold the air bag doors and accordingly a knee air bag, also when the gap between a glove compartment door outer and the knees of a vehicle occupant is narrow.

Means for Solving the Problems

A first aspect comprises: an air bag module structured to include a knee air bag that, at non-collision times, is in a folded-up state, and, at the time of a collision, is expanded and unfolded toward knees of a vehicle occupant; and a glove compartment door that opens and closes a glove compartment main body provided at a predetermined position of an instrument panel, and that houses the air bag module at an interior of the glove compartment door, wherein a glove compartment door outer that is disposed at a vehicle cabin inner side of the glove compartment door is structured to include a lower door structured by a pair of lower-side side doors that are disposed at both outer sides in a glove compartment door transverse direction and unfold leftward and rightward, and a lower central door disposed between the pair of lower-side side doors and formed from one door, and an upper door structured by three doors that are a pair of upper-side side doors that are disposed above the lower door at both outer sides in the glove compartment door transverse direction and unfold in left and right directions, and an upper central door disposed between the pair of upper-side side doors and formed from one door, or an upper door that is structured by one upper portion door, and, due to a predetermined bag expanding pressure being applied, the glove compartment door outer fractures from a fracture portion and unfolds upward, downward, leftward and rightward, and when, in a state in which a vehicle occupant of a small build is seated, knees of the vehicle occupant are near to or are abutting the pair of lower-side side doors, an opening surface area of the lower central door in an initial stage of unfolding of air bag doors is set to be smaller than an opening surface area of the upper door in the initial stage of unfolding of the air bag doors.

A third aspect has the feature that, in the knee air bag device for a vehicle of the first aspect, the fracture portion is structured to include a lateral direction fracture portion that extends in the glove compartment door transverse direction in order to unfold the air bag doors upward and downward, and a pair of left and right vertical direction fracture portions that extend from a midway region of the lateral direction fracture portion toward a lower side of the glove compartment door in order to unfold the pair of lower-side side doors leftward and rightward at the both outer sides of the lower door.

A fourth aspect has the feature that, in the knee air bag device for a vehicle of the third aspect, the lateral direction fracture portion is disposed so as to be offset further toward a door lower side than a vertical direction central position of the air bag doors.

A fifth aspect has the feature that, in the knee air bag device for a vehicle of the third aspect, the vertical direction fracture portions are set so as to have line symmetry with respect to the lateral direction fracture portion, and the air bag doors are structured altogether by six doors.

A sixth aspect has the feature that, in the knee air bag device for a vehicle of the first aspect, the glove compartment door is disposed at a position facing knees of a vehicle occupant in a seated state, and the air bag module is housed within the glove compartment door.

A seventh aspect has the feature that, in the knee air bag device for a vehicle of the first aspect, a length, in the glove compartment door transverse direction, of the lower door is set such that the lower door enters-in between both knees of a vehicle occupant of a small build at a time of unfolding of the air bag doors.

An eighth aspect has the feature that, in the knee air bag device for a vehicle of the third aspect, the fracture portion is structured by a lateral direction fracture portion that is formed along a vehicle transverse direction, and a pair of left and right vertical direction fracture portions that are formed in substantially semicircular shapes so as to intersect at two places that are toward a center of the lateral direction fracture portion.

A ninth aspect has the feature that, in the knee air bag device for a vehicle of the third aspect, the fracture portion is structured by a lateral direction fracture portion that is formed along a vehicle transverse direction, a pair of left and right lower vertical direction fracture portions that are formed in substantially arcuate shapes toward a lower portion side of the air bag doors from two places that are toward a center of the lateral direction fracture portion, and a pair of left and right upper vertical direction fracture portions that extend from both end portions of the lateral direction fracture portion toward an upper portion side of the air bag doors.

In accordance with the first aspect, the glove compartment main body is provided at a predetermined position of the instrument panel, and the glove compartment main body can be opened and closed by the glove compartment door.

At times of non-collision, the knee air bag is housed in a folded-up state within the glove compartment door, but, when the time of a collision comes, the knee air bag is expanded and unfolded toward the knees of the vehicle occupant. Concretely, when the knee air bag that is in the folded-up state expands and a predetermined bag expanding pressure is applied to the glove compartment door outer, the glove compartment door outer fractures along the fracture portion provided at the glove compartment door outer, and the plural air bag doors are unfolded upward, downward, leftward, and rightward. Due thereto, the knee air bag is expanded and unfolded toward the knees of the vehicle occupant.

By the way, in the case of a vehicle occupant of a small build or the like, the knees of the vehicle occupant may be near to or be abutting the lower portion side of the air bag doors (the glove compartment door outer). In this case, because the lower door, that is disposed at the lower portion side of the air bag doors, unfolds downward, if the lower door is a rectangular air bag door that is one door and the both knees are near to or are abutting the both sides thereof, it is difficult for the lower door to open (it is difficult for fracturing of the fracture portion to proceed smoothly).

However, in the present aspect, the opening surface area of the lower central door in the initial stage of unfolding of the air bag doors is set to be smaller than the opening surface area of the upper door in the initial stage of unfolding of the air bag doors (i.e., the lower central door in the initial stage of unfolding of the air bag doors is made to be more compact than the upper door), and therefore, the lower central door is unfolded smoothly downward between the both knees of the vehicle occupant, and assists the rapid expansion and unfolding of the knee air bag from the lower central door side. Furthermore, because the opening surface area in the initial stage of unfolding of the air bag doors is greater at the upper door than at the lower door, the knee air bag is rapidly unfolded as usual from the upper door.

In accordance with the first aspect, because the pair of lower-side side doors that unfold leftward and rightward are formed at both outer sides in the glove compartment door transverse direction of the lower door, the both sides of the lower portion side of the air bag doors unfold leftward and rightward, and the central portion is unfolded downward. When such an unfolding form is employed, the entire lower portion side of the air bag doors can be unfolded smoothly.

Namely, if the lower door, whose opening surface area in the initial stage of unfolding of the air bag doors is relatively smaller than the upper door, is set in advance so as to be positioned between the both knees of the vehicle occupant, the lower door is unfolded downward without a problem. Further, to somehow speak with respect to the lower-side side doors of the both sides, because the knees form semicircular shapes in plan view, the knees are contacting the lower portion sides of the air bag doors in point-contacting states even if the knees are abutting the lower portion sides of the air bag doors. Accordingly, substantially triangular gaps are formed at the portions where lines at the outer sides of the contacting points of the knees in plan view, and the line (a substantially straight line) of the design surface of the lower portion side of the air bag doors, intersect. Therefore, the lower-side side doors are unfolded, from these substantially triangular gaps, leftward and rightward so as to lightly follow the lines at the outer sides of the contacting points of the knees of the vehicle occupant.

In accordance with the third aspect, when the bag expanding pressure of the knee air bag reaches a predetermined pressure, the lateral direction fracture portion fractures in order to unfold the air bag doors upward and downward, and the pair of left and right vertical direction fracture portions, that extend from a midway region of the lateral direction fracture portion toward the lower side of the glove compartment door, fracture. Due thereto, the lower-side side doors are formed at both outer sides of the lower door, and these lower-side side doors are unfolded leftward and rightward. By extending the pair of left and right vertical direction fracture portions in this way from the midway region of the lateral direction fracture portion toward the lower side of the glove compartment door, the lower-side side doors can be structured by two sides that is the minimum number of sides created by the fracture portion (note that the one sides remain as centers of unfolding (hinges), and therefore, do not fracture). Accordingly, the lower-side side doors are formed rapidly, and can be unfolded.

In accordance with the fourth aspect, because the lateral direction fracture portion is disposed so as to be offset further toward a door lower side than the vertical direction central position of the air bag doors, the opening surface area ratio of the lower door with respect to the upper door in the initial stage of unfolding of the air bag doors can be easily changed by this offset amount.

In accordance with the fifth aspect, the vertical direction fracture portions are set so as to have line symmetry with respect to the lateral direction fracture portion, and the air bag doors are structured altogether by six doors, and thus, the unfolding behaviors (unfolding modes) of the air bag doors at the upper portion side and the lower portion side of the air bag doors can be made to be substantially the same, Therefore, the effect (the unfolding resistance of the knee air bag) on the expansion operation of the knee air bag, that is expanded toward the knees of the vehicle occupant as the air bag doors unfold while the lateral direction fracture portion and the vertical direction fracture portions are fractured, can be made to be substantially the same at the upper and lower sides.

Effects of the Invention

As described above, the knee air bag device for a vehicle relating to the first aspect has the excellent effect that, when tear type air bag doors are employed, the air bag doors and accordingly the knee air bag can be unfolded rapidly also when the gap between the glove compartment door outer and the knees of the vehicle occupant is narrow.

The knee air bag device for a vehicle relating to the first aspect has the excellent effect that, not only the lower door at the lower portion side of the air bag doors, but also the lower-side side doors at the left and right can be unfolded as rapidly and smoothly as possible.

Similarly to the first aspect, the knee air bag device for a vehicle relating to the third aspect has the excellent effect that, not only the lower door at the lower portion side of the air bag doors, but also the lower-side side doors at the left and right can be unfolded as rapidly and smoothly as possible.

The knee air bag device for a vehicle relating to the fourth aspect has the excellent effect that, by adjusting the offset amount of the lateral direction fracture portion, the unfolding performance of the air bag doors can be tuned easily.

The knee air bag device for a vehicle relating to the fifth aspect has the excellent effect that, because the unfolding behaviors (unfolding modes) of the air bag doors become substantially the same above and below the lateral direction fracture portion, this can contribute to stabilizing the unfolding performance of the knee air bag.

PREFERRED FORMS FOR IMPLEMENTING THE INVENTION

[First Embodiment]

Hereinafter, a first embodiment of a knee air bag device for a vehicle relating to the present invention is described by using FIG. 1 through FIG. 7. Note that arrow FR shown appropriately in these drawings indicates the vehicle front side, arrow UP indicates the vehicle upper side, and arrow IN indicates the vehicle transverse direction inner side.

Figure 1:
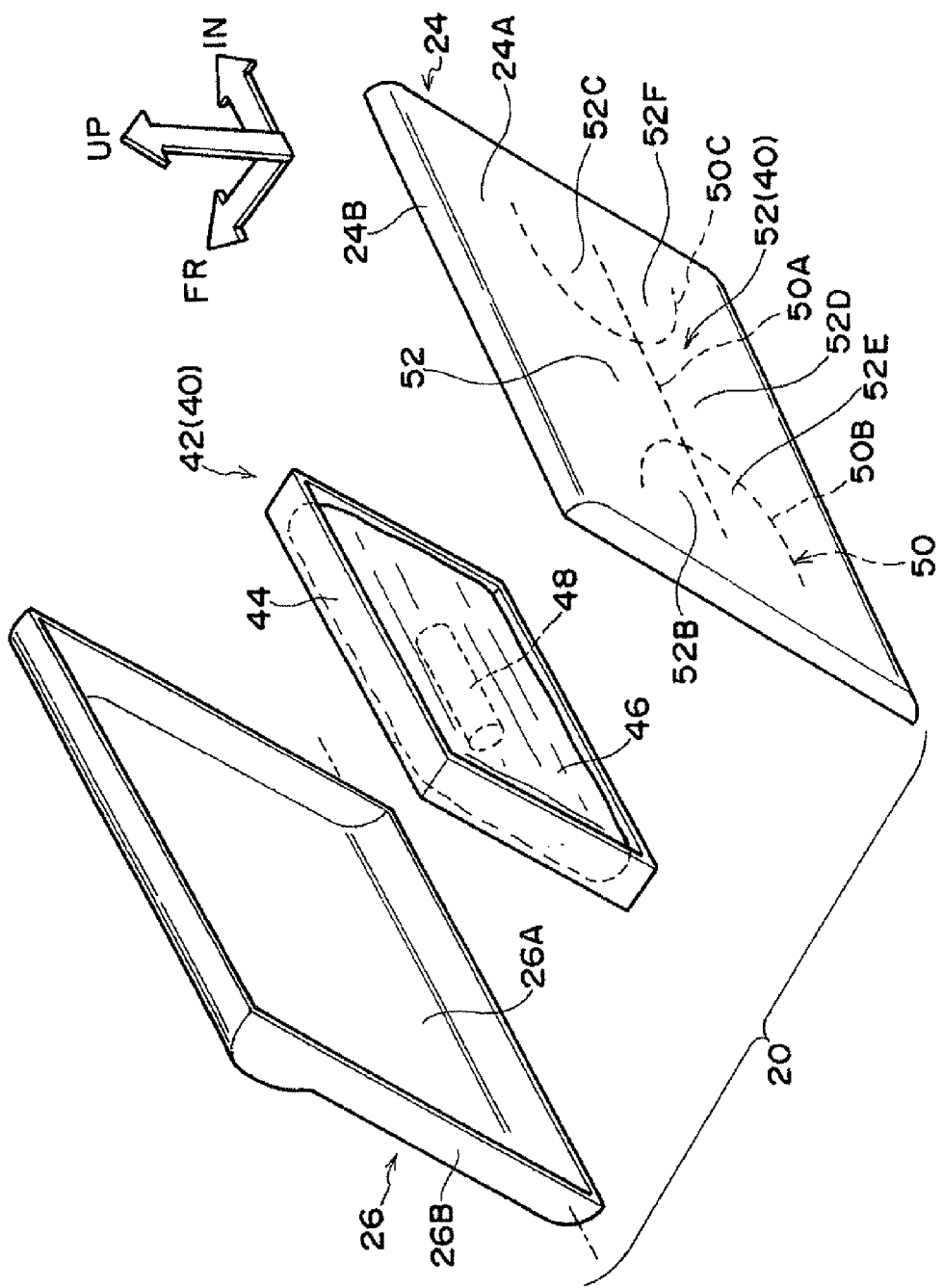
FIG. 1 is an exploded perspective view of a glove compartment door in a glove compartment door built-in-type knee air bag device relating to a first embodiment.
Figure 2:
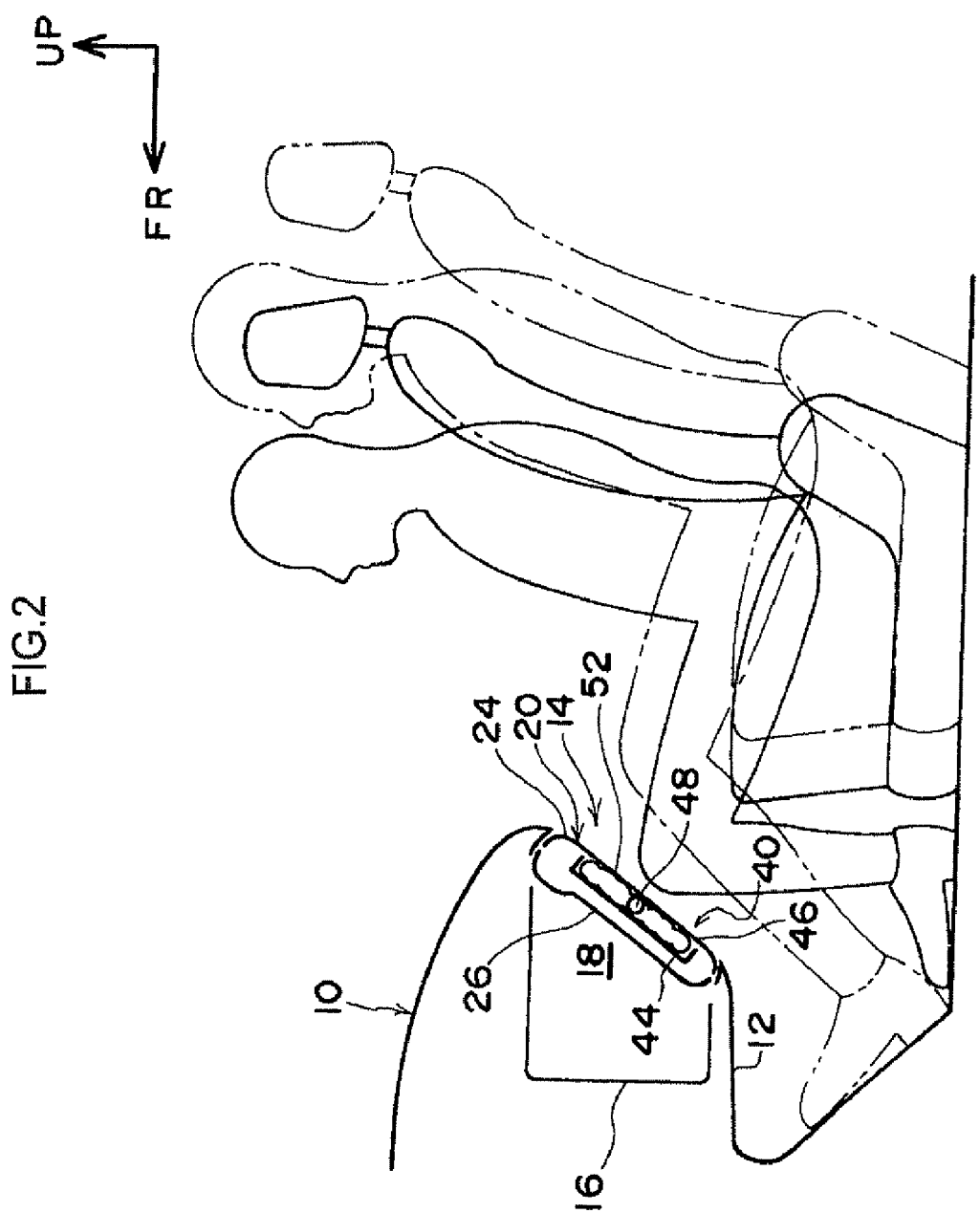
FIG. 2 is a schematic vertical sectional view showing the overall structure in an assembled state of the glove compartment door built-in-type knee air bag device shown in FIG. 1.
Figure 3:
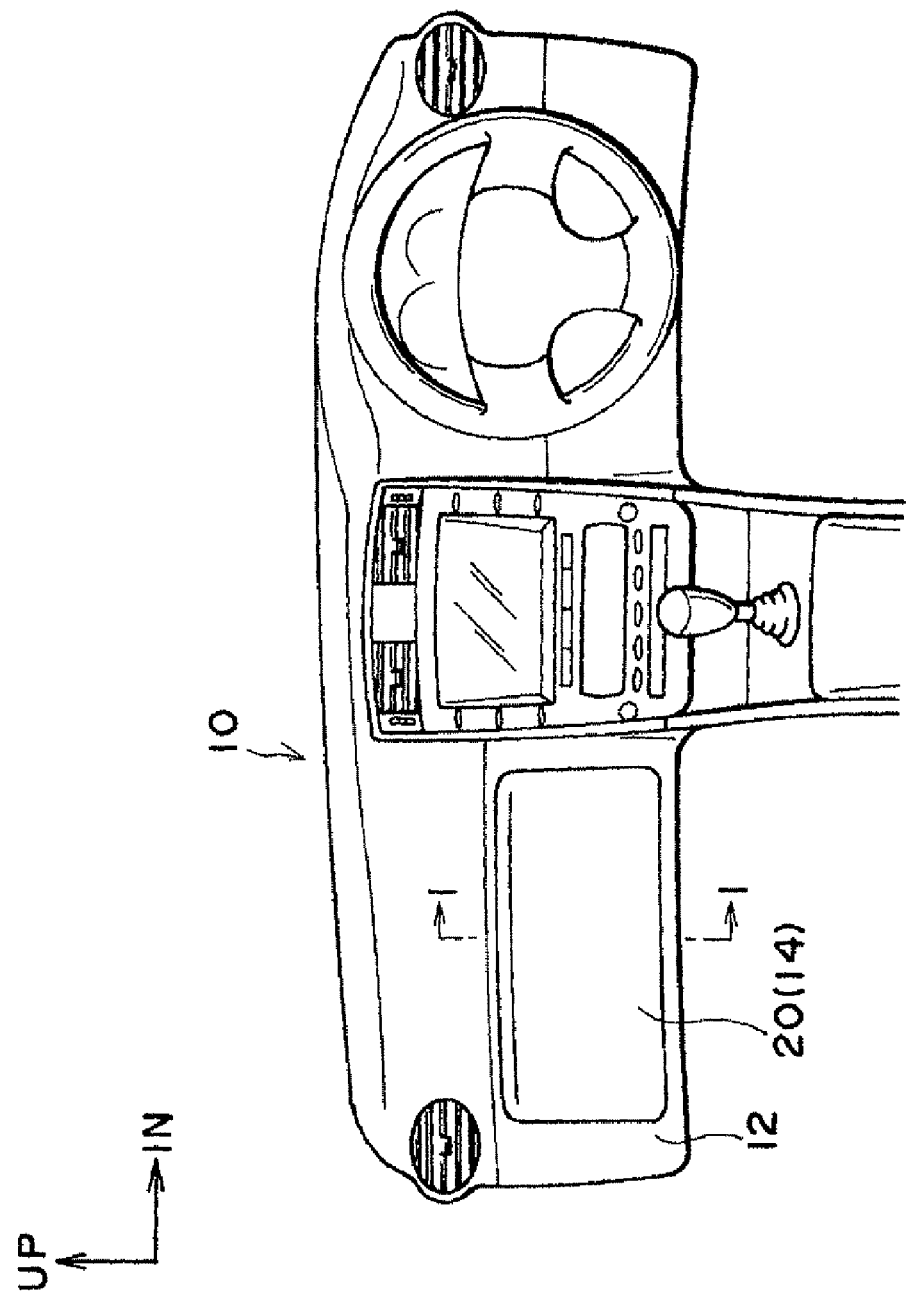
FIG. 3 is an external front view of an instrument panel in which the glove compartment door built-in-type knee air bag device is installed.
Figure 4:
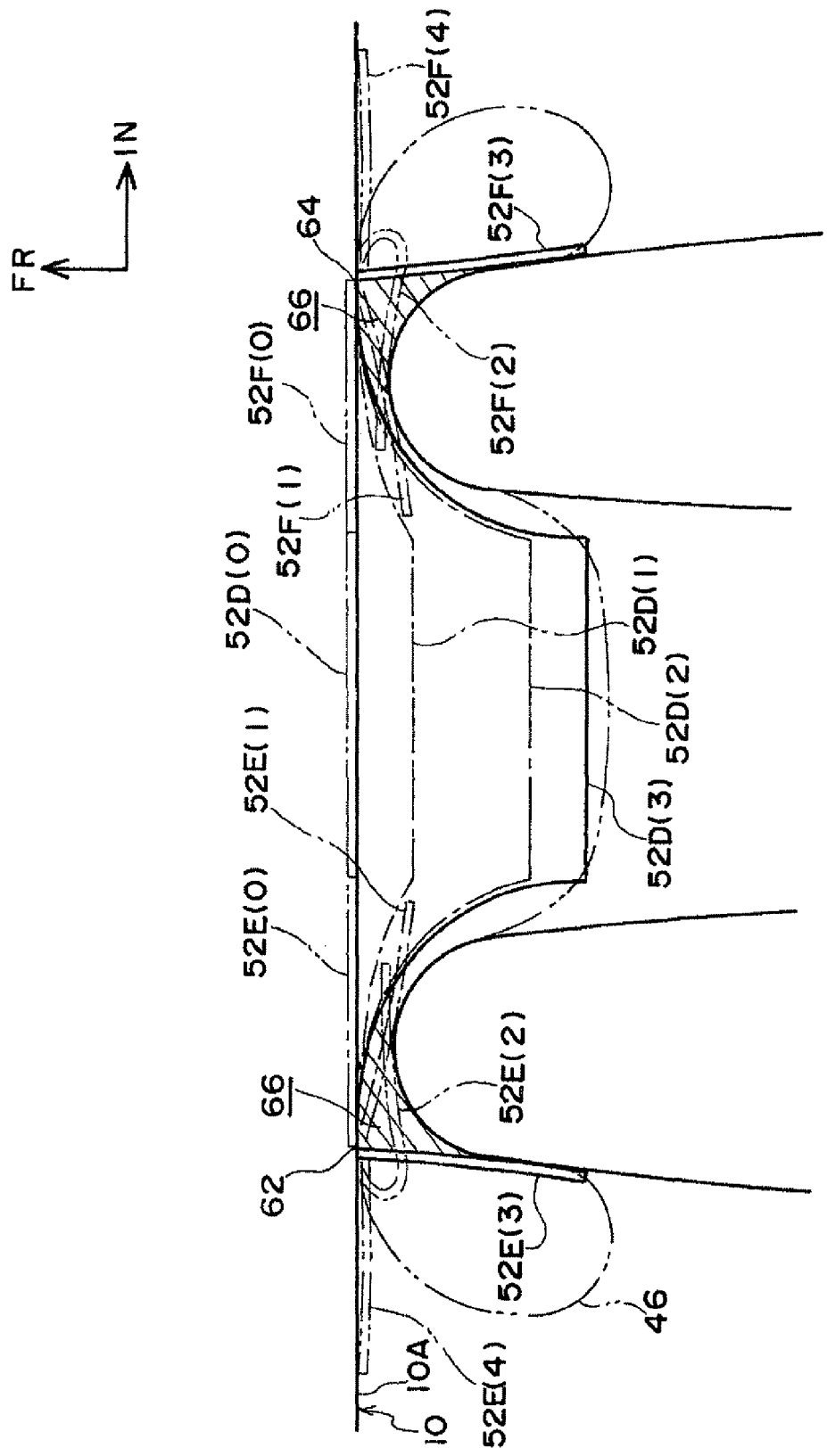
FIG. 4 is a plan view in which the state of unfolding of air bag doors shown in FIG. 2 is drawn continuously.

An exploded perspective view of a glove compartment door in a glove compartment door built-in-type knee air bag device relating to the present embodiment is shown in FIG. 1. A schematic vertical sectional view showing the overall structure in an assembled state of the glove compartment door built-in-type knee air bag device is shown in FIG. 2. An external front view of an instrument panel in which the glove compartment door built-in-type knee air bag device is installed is shown in FIG. 3. A plan view in which the state of unfolding of air bag doors is drawn continuously is shown in FIG. 4.

As shown in FIG. 3, a glove compartment 14 for placing small items is disposed at a position opposing the knees of a vehicle occupant at the front passenger's seat side of an instrument panel 10 (more accurately, at the upper portion of an instrument panel lower 12 that structures the lower portion of the instrument panel 10). As shown in FIG. 2, the glove compartment 14 is structured by a glove compartment main body 16 that is made of resin and formed in the shape of a box, and a glove compartment door 20 that opens and closes an opening portion 18 of the glove compartment main body 16. The glove compartment main body 16 is disposed such that the opening portion 18 faces the vehicle rear side (the vehicle cabin inner side).

As shown in FIG. 1 and FIG. 2, the contour of the glove compartment door 20 that closes the opening portion 18 of the aforementioned glove compartment main body 16 is structured by a glove compartment door outer 24, that is disposed at the vehicle cabin inner side and forms the design surface and is made of resin, and a glove compartment door inner 26, that is disposed at the vehicle front side of this glove compartment door outer 24 is formed integrally with the glove compartment door outer 24 and is made of resin.

As shown in FIG. 1, the glove compartment door outer 24 is formed in a substantially rectangular tray shape, and has a glove compartment door outer general portion 24A, that structures the design surface and is substantially rectangular flat-plate-shaped, and a glove compartment door outer peripheral wall portion 24B, that stands-up from the outer peripheral four sides of the glove compartment door outer general portion 24A.

On the other hand, the glove compartment door inner 26 as well is formed in a tray shape of a size that can be fit with the glove compartment door outer 24. Accordingly, similarly to the glove compartment door outer 24, the glove compartment door inner 26 as well has a glove compartment door inner general portion 26A, that is disposed substantially parallel to the glove compartment door outer general portion 24A and is substantially rectangular flat-plate-shaped, and a glove compartment door inner peripheral wall portion 26B, that stands-up from the outer peripheral four sides of the glove compartment door inner general portion 26A. Note that the floor of the glove compartment door inner 26 is formed to be deeper than that of the glove compartment door outer 24.

Unillustrated plural vertical ribs and lateral ribs, that are formed integrally with the glove compartment door inner 26, are formed at the interior of the above-described glove compartment door inner 26. Both the vertical ribs and the lateral ribs are made of resin, and the glove compartment door outer 24 and the glove compartment door inner 26 are made integral due to the distal end portions of these vertical ribs and lateral ribs being heat welded to the vehicle front side surface of the glove compartment door outer 24. Note that the glove compartment door outer 24 and the glove compartment door inner 26 are heat welded also at the glove compartment door outer peripheral wall portion 24B and the glove compartment door inner peripheral wall portion 26B. However, the method of welding is not limited to this, and may be vibration welding, ultrasonic welding, or the like.

An air bag module 42 of a glove compartment door built-in-type knee air bag device 40 is housed within the above-described glove compartment door 20. Note that the glove compartment door built-in-type knee air bag device 40 is structured by air bag doors 52 and the air bag module 42 that are described below.

The air bag module 42 is structured with the main portions thereof being an air bag case 44 that is formed in a box shape and is made of resin, a knee air bag 46 that is housed in a folded-up state in this air bag case 44, and an inflator 48 that is cylindrical and is disposed at the substantial center of the air bag case 44. Note that the knee air bag 46 may be folded-up by being folded by rolling, or may be folded-up by being folded in a bellows-like form, or may be folded-up by a combination of the both. Further, at the glove compartment door built-in-type knee air bag device 40, the inflator 48, that is an element that is understood in a wide sense as a gas generating means, is disposed at the substantial center of the air bag case 44 interior, but is not limited to this, and the inflator may be disposed so as to be offset toward the upper end side or the lower end side of the air bag case 44 interior, or the inflator may be set at the exterior of the glove compartment door and this inflator and the knee air bag 46 may be communicated by a tube or the like.

Note that the end portion at the open side of the peripheral wall portion of the above-described air bag case 44 is heat welded to the vehicle front side surface of the glove compartment door outer 24. However, the method of welding is not limited to this, and may be vibration welding, ultrasonic welding, or the like.

Figure 5:
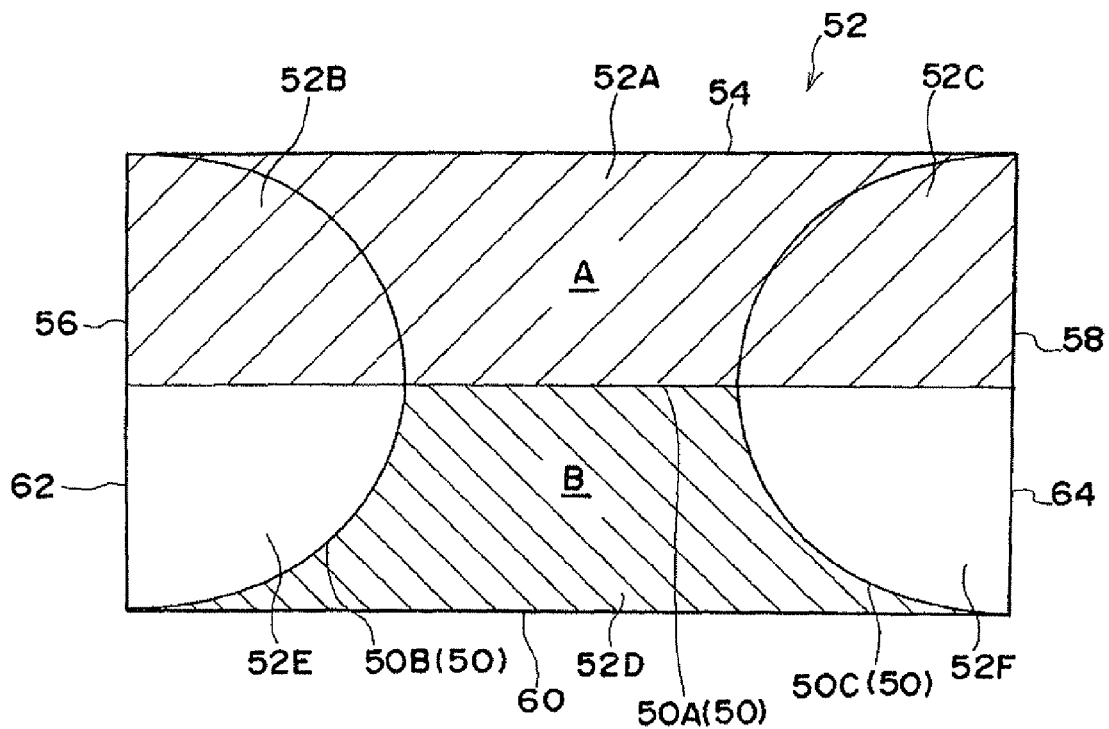
FIG. 5 is a schematic view showing, from the front and in an enlarged manner, the divided structure of the air bag doors shown in FIG. 2.

Here, a fracture portion (tear line) 50 of a predetermined shape that is structured as a thin-walled portion, is formed at the reverse surface side of the glove compartment door outer general portion 24A at the above-described glove compartment door outer 24 (the surface at the vehicle front side that faces the glove compartment door inner 26). To describe this more concretely, as shown in FIG. 5, the fracture portion 50 is structured by a lateral direction fracture portion 50A, that is rectilinear and extends along the vehicle transverse direction, and a pair of left and right vertical direction fracture portions 50B, 50C that are formed in substantially semicircular shapes so as to intersect the lateral direction fracture portion 50A. Note that the left and right vertical direction fracture portions 50B, 50C are formed at positions that are separated by a predetermined distance in the vehicle transverse direction, and the both do not intersect.

Due thereto, when a bag unfolding pressure that is applied to the fracture portion 50 reaches a predetermined value, the glove compartment door outer general portion 24A fractures along the fracture portion 50, and a total of six of the air bag doors 52 (an upper central air bag door 52A, an upper left air bag door 52B, an upper right air bag door 52C, a lower central air bag door 52D, a lower left air bag door 52E, and a lower right air bag door 52F) are formed.

The upper central air bag door 52A, the upper left air bag door 52B and the upper right air bag door 52C, and the lower central air bag door 52D, the lower left air bag door 52E and the lower right air bag door 52F, are line symmetrical with respect to the lateral direction fracture portion 50A. Accordingly, the upper central air bag door 52A and the lower central air bag door 52D, and the upper left air bag door 52B and the lower left air bag door 52E, and the upper right air bag door 52C and the lower right air bag door 52F, are respectively set to be the same surface areas. Further, in FIG. 5, hatched portion A applied to the upper portion side of the air bag doors 52 and hatched portion B applied to the lower portion side of the air bag doors 52 are portions that open in the initial stage of unfolding of the air bag doors 52. Namely, the lower left air bag door 52E and the lower right air bag door 52F, at which there is the possibility that the both knees are disposed near to or abutting the lower left air bag door 52E and the lower right air bag door 52F when a vehicle occupant of a small build or the like is seated on the seat for a vehicle, are drawn in FIG. 5 as the white air bag doors in order to differentiate them from the other air bag doors 52 (the hatched portions A, B).

When described by the schematic drawing shown in FIG. 5, the total six air bag doors 52 form a rectangular shape when not unfolded, and the four sides thereof all become hinges at the time of unfolding, and therefore, do not fracture. For convenience of explanation, the hinges disposed at the upper side of the lateral direction fracture portion 50A are called a first upper hinge 54, a first left hinge 56 and a first right hinge 58, and the hinges disposed at the lower side of the lateral direction fracture portion 50A are called a second lower hinge 60, a second left hinge 62 and a second right hinge 64.

To supplement explanation, an unillustrated release knob is provided at the upper edge side of the above-described glove compartment door 20, and, due to a vehicle occupant operating the release knob by a finger, the engaged state with an unillustrated locking mechanism provided at the opening portion 18 side of the glove compartment main body 16 is released, and rotates (opens) toward the cabin inner side around the lower end portion due to the urging force of an urging means such as an unillustrated spring or the like.

(Operation and Effects of Present Embodiment)

The operation and effects of the present embodiment are described next.

When the vehicle, in which the glove compartment door built-in-type knee air bag device 40 of the above-described structure is installed, front-collides, the state thereof is sensed by an unillustrated collision sensing means, and a sensing signal is outputted to an air bag ECU. When air bag operation is decided by the air bag ECU, various types of air bag devices at the driver's seat side operate, and in addition, the glove compartment door built-in-type knee air bag device 40 at the front passenger's seat side also operates. Namely, predetermined current is sent to the squib of the inflator 48 of the air bag module 42 that is built in the glove compartment door 20, and the inflator 48 is operated. Due thereto, gas is generated from the inflator 48, this gas is supplied into the knee air bag 46 that is housed within the glove compartment door 20 in a folded-up state, and this is expanded.

Because the open side end portion of the peripheral wall portion of the air bag case 44 is heat welded to the vehicle front side surface of the glove compartment door outer 24, the expanding pressure of the knee air bag 46 works on the glove compartment door outer 24 without loss, and the glove compartment door outer general portion 24A is fractured rapidly along the fracture portion 50. Due thereto, as shown in FIG. 7A, FIG. 7B, the air bag doors 52 unfold upward, downward, leftward and rightward, and the knee air bag 46 is expanded and unfolded between the instrument panel 10 and the both knees of the vehicle occupant, and the both knees of the vehicle occupant are restrained and protected by the knee air bag 46.

By the way, as shown by the solid lines in FIG. 2, in the case of a vehicle occupant of a small build, the knees of the vehicle occupant may be near to or abutting the lower portion side of the air bag doors 52 (the glove compartment door outer 24). Note that, in FIG. 2, the case of a vehicle occupant of a large build is shown by the two-dot chain lines for comparison. In a case such as the knees of the vehicle occupant being near to or abutting the lower portion side of the air bag doors 52 in the case of a vehicle occupant of a small build or the like in this way, if the lower door disposed at the lower portion side of the air bag doors is a rectangular air bag door that is one door and the both knees are disposed near to the transverse direction both end portions thereof or the both knees are abutting the transverse direction both end portions of the air bag door, it is difficult for the transverse direction both end portions of this rectangular lower door to open (i.e., it is difficult for the fracturing of the fracture portion to proceed smoothly).

However, in the present embodiment, by structuring the fracture portion 50 by the one lateral direction fracture portion 50A and the two left and right arcuate vertical direction fracture portions 50B, 50C, the air bag doors 52 are divided in six, and the air bag doors 52 unfold as follows because the lower central air bag door 52D that corresponds to the lower door is made to be compact as compared with the upper central air bag door 52A, the upper left air bag door 52B, and the upper right air bag door 52C overall that correspond to the upper door.

Figure 6A:
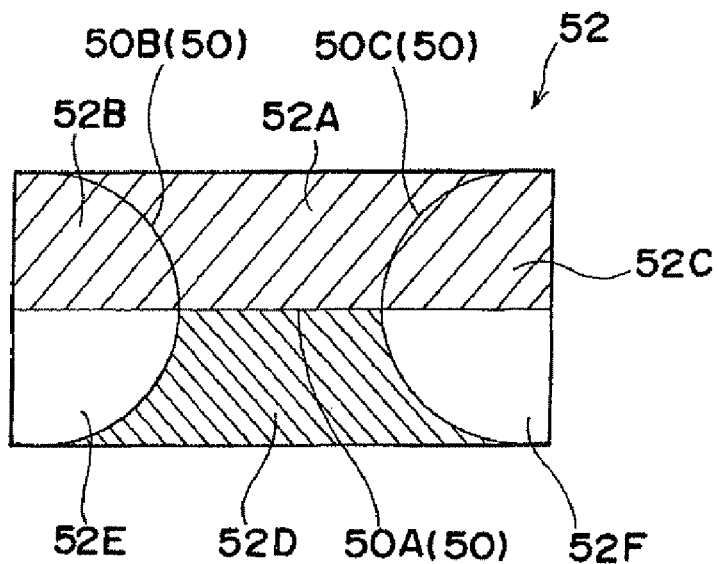
FIG. 6A is the same schematic view (front view) as FIG. 5 showing a non-unfolded state of the air bag doors.
Figure 6B:
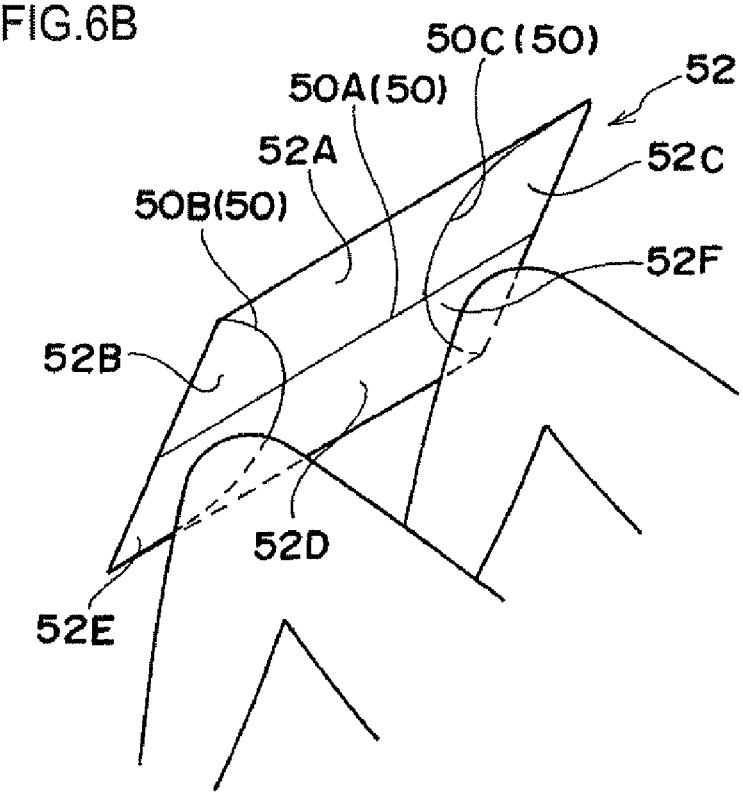
FIG. 6B is a schematic perspective view showing the position of the knees of a vehicle occupant of a small build, in relation to the air bag doors.
Figure 7A:
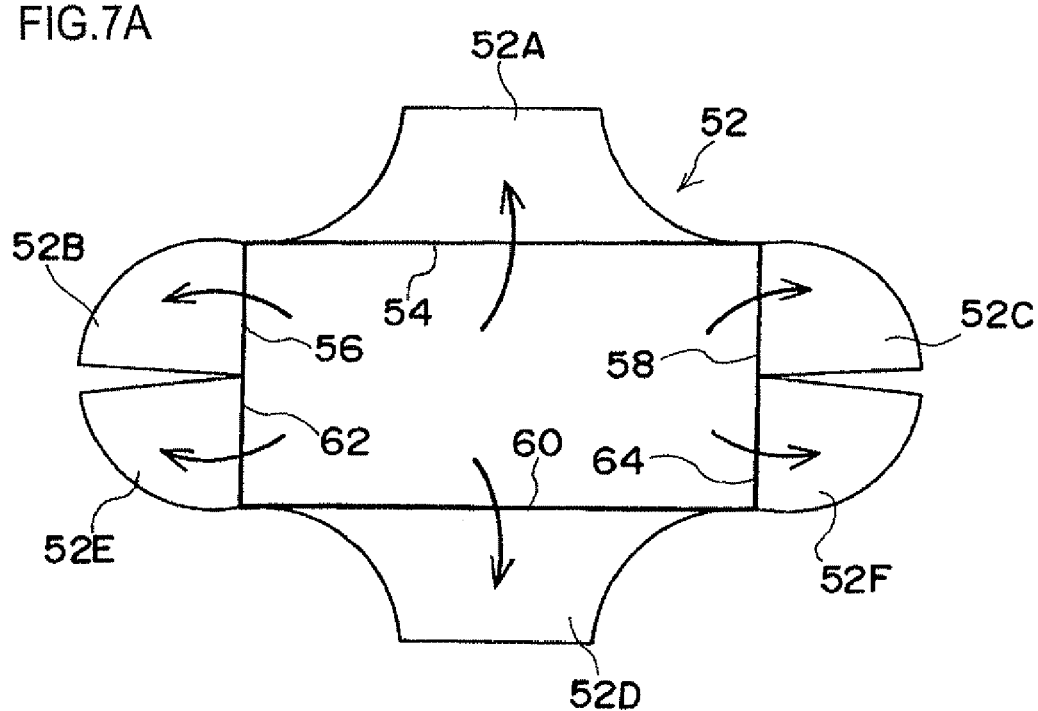
FIG. 7A is a schematic view (front view) showing an unfolded state of the air bag doors.
Figure 7B:
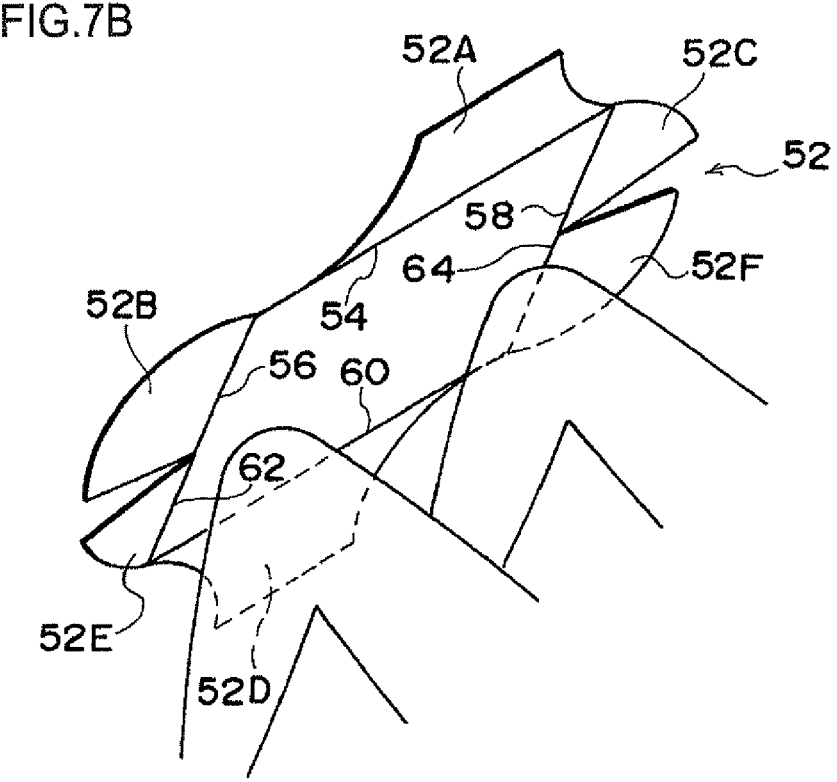
FIG. 7B is a schematic perspective view showing the position of the knees of a vehicle occupant of a small build, in relation to the air bag doors.

First, as shown in FIG. 6A, FIG. 6B, with regard to the upper portion side of the air bag doors 52, something that impedes the unfolding operation does not exist in particular, and therefore, as shown in FIG. 7A, FIG. 7B, all of the upper central air bag door 52A, the upper left air bag door 52B, and the upper right air bag door 52C are unfolded simultaneously and smoothly upward and in the left and right directions.

On the other hand, as shown in FIG. 4 and FIG. 6B, because the length of the lower central air bag door 52D in the transverse direction thereof is set to a length of an extent that enters-in between the both knees of the aforementioned vehicle occupant, the lower central air bag door 52D is unfolded downward smoothly. In contrast, as shown in FIG. 4, when the lower left air bag door 52E and the lower right air bag door 52F unfold, they immediately abut the both knees, and therefore, it is difficult for them to unfold leftward and rightward while drawing the same loci as the upper left air bag door 52B and the upper right air bag door 52C. However, both the lower left air bag door 52E and the lower right air bag door 52F are formed in substantial quadrant shapes, and are made to be more compact than the lower central air bag door 52D, and unfold with the centers of unfolding being the second left hinge 62, the second right hinge 64 that are set in rectilinear shapes along the vehicle vertical direction. Therefore, the distal end portions of the lower left air bag door 52E and the lower right air bag door 52F move and come out so as to follow the outer side surfaces of the knees of the vehicle occupant by using gaps 66 (the hatched portions) that are substantially triangular in plan view and that are formed between a design surface 10A of the instrument panel 10 and the knees of the vehicle occupant (this point is described further below). Accordingly, in the initial stage of unfolding of the air bag doors 52, only the lower central air bag door 52D unfolds downward, and immediately successively, the lower left air bag door 52E, the lower right air bag door 52F unfold toward the left and right both sides. Note that a continuous drawing of the unfolding operations of the lower central air bag door 52D, the lower left air bag door 52E, the lower right air bag door 52F is shown in FIG. 4, and (0) in parentheses to the side of the reference numeral shows the non-unfolded state, (1) shows starting of unfolding, (2) shows a state of being unfolded approximately 45°, (3) shows a state of being unfolded approximately 90°, respectively. Further, (4) showing an unfolding completed state also is appended to the lower left air bag door 52E, the lower right air bag door 52F.

The lower portion of the air bag doors 52 is divided in three in the vehicle transverse direction in this way, and the opening surface area of the lower door (the lower central air bag door 52D) in the initial stage of unfolding is set to be smaller than the opening surface area of the upper door (the upper central air bag door 52A, the upper left air bag door 52B, the upper right air bag door 52C) (i.e., the lower central air bag door 52D that corresponds to the lower door is made to be compact to a size that can unfold between the both knees of the vehicle occupant). Therefore, in the initial stage of unfolding of the air bag doors 52, a total of four doors that are the upper central air bag door 52A, the upper left air bag door 52B, the upper right air bag door 52C, and the lower central air bag door 52D are unfolded very rapidly. Due thereto, the opening portion for expansion of the knee air bag 46 is ensured to be large from the initial stage of unfolding of the air bag doors 52, and rapid unfolding of the knee air bag 46 is ensured. Further, because the lower left air bag door 52E and the lower right air bag door 52F as well unfold leftward and rightward slightly later than the lower central air bag door 52D, the unfolding operation of the air bag doors 52 is completed at a very early stage.

As a result, in accordance with the present embodiment, when the tear type air bag doors 52 are employed, also when the gap between the glove compartment door outer 24 and the knees of the vehicle occupant is narrow, the air bag doors 52 are unfolded rapidly, and the knee air bag 46 can be interposed between the instrument panel 10 and the knees of the vehicle occupant.

Further, in the present embodiment, as described above, the air bag doors 52, and the air bag doors disposed at the lower portion side in particular, are structured by the lower central air bag door 52D that unfolds downward around the second lower hinge 60, and the lower left air bag door 52E, the lower right air bag door 52F that unfold leftward and rightward around the second left hinge 62, the second right hinge 64, and therefore, an unfolding operation that runs along the shapes of the gaps 66 formed by the both knees of the vehicle occupant and the instrument panel 10 in the plan view shown in FIG. 4 can be caused. Accordingly, the entire lower portion side of the air bag doors 52 can be unfolded smoothly.

Namely, as described above, if the lower door (the lower central air bag door 52D), whose opening surface area in the initial stage of unfolding of the air bag doors 52 is relatively smaller than the upper doors (the upper central air bag door 52A, the upper left air bag door 52B, the upper right air bag door 52C), is set in advance so as to be positioned between the both knees of the vehicle occupant, the lower door (the lower central air bag door 52D) is unfolded downward without problems. On the other hand, to somehow speak with respect to the lower left air bag door 52E, the lower right air bag door 52F of the both sides, because the knees form semicircular shapes in plan view, the knees are contacting the lower portion sides of the air bag doors 52 in point-contacting states even if the knees are abutting the lower portion sides of the air bag doors 52. Accordingly, the triangular gaps 66 are formed at the portions where lines at the outer sides of the contacting points of the knees in plan view, and the line (a substantially straight line) of the design surface 10A of the instrument panel 10, intersect. Therefore, the lower left air bag door 52E and the lower right air bag door 52F come out through the triangular gaps 66, and are unfolded leftward and rightward so as to lightly follow the lines at the outer sides of the contacting points of the knees of the vehicle occupant. As a result, in accordance with the present embodiment, not only the lower door (the lower central air bag door 52D) of the lower portion side of the air bag doors 52, but also the left and right lower-side side doors (the lower left air bag door 52E, the lower right air bag door 52F) can be unfolded as rapidly and smoothly as possible.

Further, in the present embodiment, when the bag expanding pressure of the knee air bag 46 reaches a predetermined pressure, the lateral direction fracture portion 50A fractures in order to unfold the air bag doors 52 upward and downward, and the pair of left and right vertical direction fracture portions 50B, 50C, that extend from the midway region of the lateral direction fracture portion 50A toward the lower side of the glove compartment door, fracture. Due thereto, the lower left air bag door 52E and the lower right air bag door 52F are formed at the both outer sides of the lower central air bag door 52D, and are unfolded leftward and rightward. By extending the pair of left and right vertical direction fracture portions 50B, 50C from the midway region of the lateral direction fracture portion 50A toward the lower side of the glove compartment door in this way, the lower left air bag door 52E and the lower right air bag door 52F can, as shown in FIG. 5, be structured by two sides that is the minimum number of sides created by the fracture portion 50 (note that the second left hinge 62 and the second right hinge 64 remain as centers of unfolding, and therefore, do not fracture). Accordingly, the lower left air bag door 52E and the lower right air bag door 52F are formed rapidly, and can be unfolded. As a result, the entirety of the air bag doors 52 including the lower left air bag door 52E and the lower right air bag door 52F can be unfolded rapidly.

Moreover, in the present embodiment, the vertical direction fracture portions 50B, 50C are set so as to have line symmetry with respect to the lateral direction fracture portion 50A, and the air bag doors 52 are structured by six doors altogether, and therefore, the unfolding behaviors (unfolding modes) of the air bag doors 52 can be made to be the same at the upper portion side and the lower portion side of the air bag doors 52. Therefore, the effect on the expansion operation of the knee air bag 46 that is expanded toward the knees of the vehicle occupant as the air bag doors 52 unfold while the lateral direction fracture portion 50A and the vertical direction fracture portions 50B, 50C are fractured (the unfolding resistance of the knee air bag 46), can be made to be the same at the upper and lower sides. Accordingly, because the unfolding behaviors (unfolding modes) of the air bag doors 52 can be made to be substantially the same above and below the lateral direction fracture portion 50A, this can contribute to stabilizing the unfolding performance of the knee air bag 46.

Note that, in the above-described embodiment, although the upper portion side of the air bag doors 52 as well is divided in three in the vehicle transverse direction, the upper portion side may be made to be a rectangular air bag door that is one door without being divided at all.

Further, in the above-described embodiment, the air bag doors 52 are a structure of six doors that are symmetrical above and below the lateral direction fracture portion 50A of the air bag doors 52, but the air bag doors are not limited to the same, and may be a structure of eight doors or the like.

[Second Embodiment]

A second embodiment of the knee air bag device for a vehicle relating to the present invention is described next by using FIG. 8 through FIG. 10. Note that the same structural portions as the above-described first embodiment are denoted by the same numbers, and description thereof is omitted.

Figure 8:
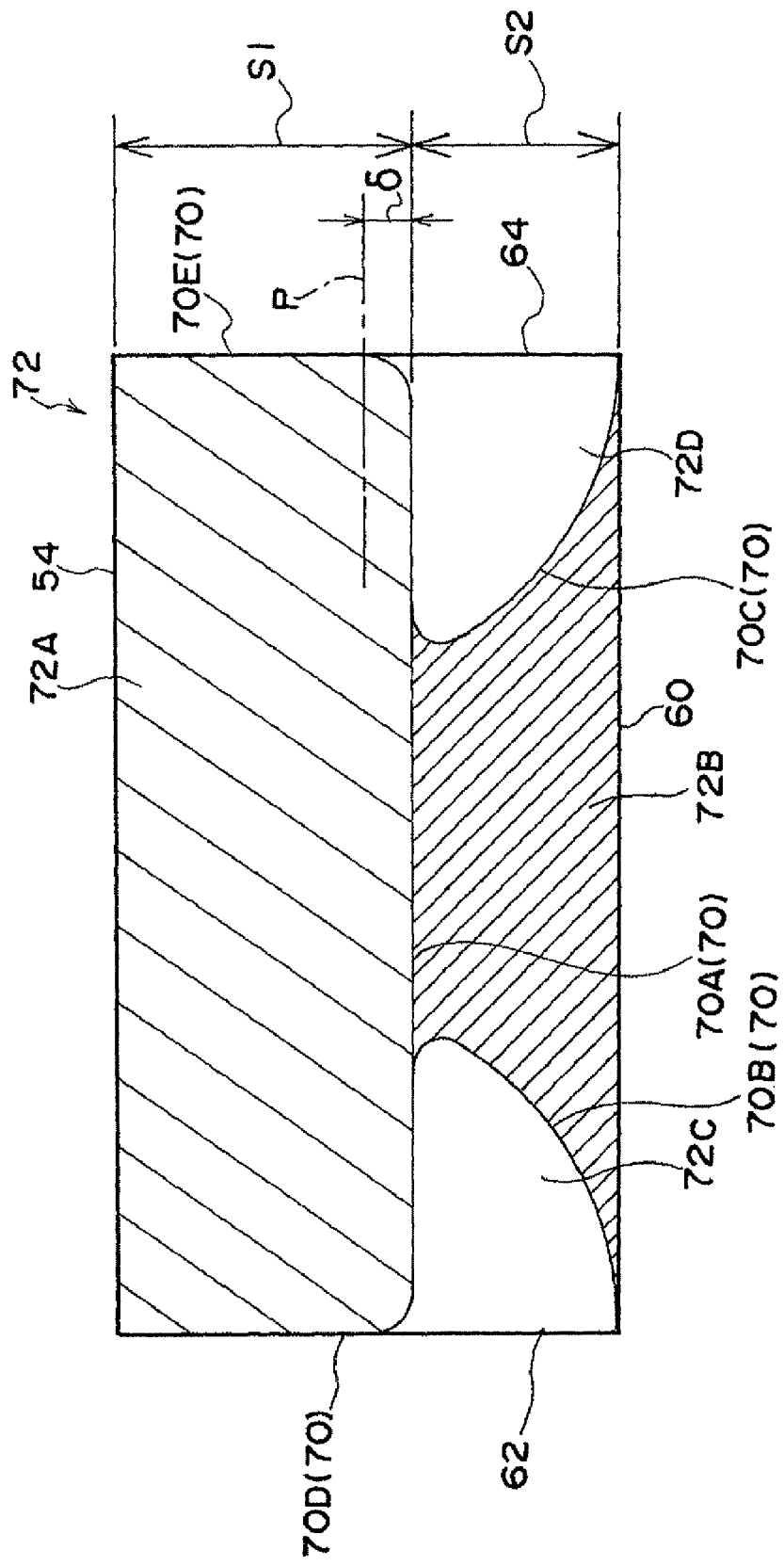
FIG. 8 is a schematic drawing showing, from the front and in an enlarged manner, the divided structure of air bag doors that are applied to a glove compartment door built-in-type knee air bag device relating to a second embodiment.

As shown in FIG. 8, in the second embodiment, a fracture portion 70 is structured by one lateral direction fracture portion 70A, two vertical direction fracture portions 70B, 70C to the left and right of the center, and two vertical direction fracture portions 70D, 70E at the left and right of the upper portion both end sides, and further, has a feature in the point that that the lateral direction fracture portion 70A is disposed so as to be offset (offset amount δ) further toward the door lower side than a vertical direction central position P of an air bag door 72. Note that the vertical direction fracture portions 70B, 70C correspond to the lower portion side vertical direction fracture portions in the present invention, and the vertical direction fracture portions 70D, 70E correspond to the upper portion side vertical direction fracture portions in the present invention.

Further, in this air bag door 72, the lateral direction fracture portion 70A is formed over the entire region in the vehicle transverse direction of the air bag door 72. Accordingly, the upper portion side (the portion positioned further toward the vehicle upper side than the lateral direction fracture portion 70A) of the air bag door 72 is structured as an upper portion air bag door 72A that is one door and is substantially rectangular.

On the other hand, the pair of left and right vertical direction fracture portions 70B, 70C are formed only at the lower portion side (the lower side of the lateral direction fracture portion 70A) of the air bag door 72. Accordingly, the shape of the lower portion side of the air bag door 72 is slightly different than that of the first embodiment, and is structured by three doors that are a lower central air bag door 72B, a lower left air bag door 72C, a lower right air bag door 72D.

Due to the above-described structure, in the state of the initial stage of unfolding of the air bag door 72 (the unfolding initial state when the unfolding operations of the lower left air bag door 72C and the lower right air bag door 72D are obstructed by the both knees of a vehicle occupant of a small build or the like), the opening surface area of the upper portion air bag door 72A (the surface area of the hatched range shown by S1) becomes approximately 60 to 70% of the entire opening surface area of the air bag door 72, and the opening surface area of the lower central air bag door 72B (the surface area of the hatched range shown by S2) is set so as to become approximately 40 to 30% of the entire opening surface area of the air bag door 72.

(Operation/Effects)

In accordance with the above-described structure, because the lateral direction fracture portion 70A is disposed so as to be offset further toward the door lower side than the vertical direction central position P of the air bag door 72, the opening surface area ratio of the lower central air bag door 72B with respect to the upper portion air bag door 72A in the initial stage of unfolding of the air bag door 72 can be easily changed by this offset amount δ.

Figure 9A:
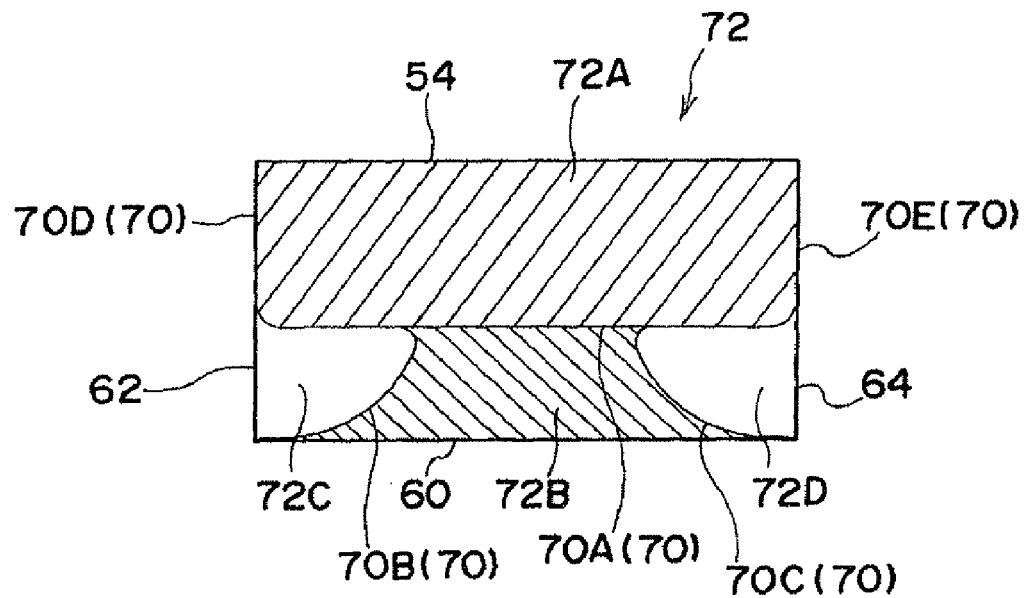
FIG. 9A is the same schematic view (front view) as FIG. 8 showing a non-unfolded state of the air bag doors.
Figure 9B:
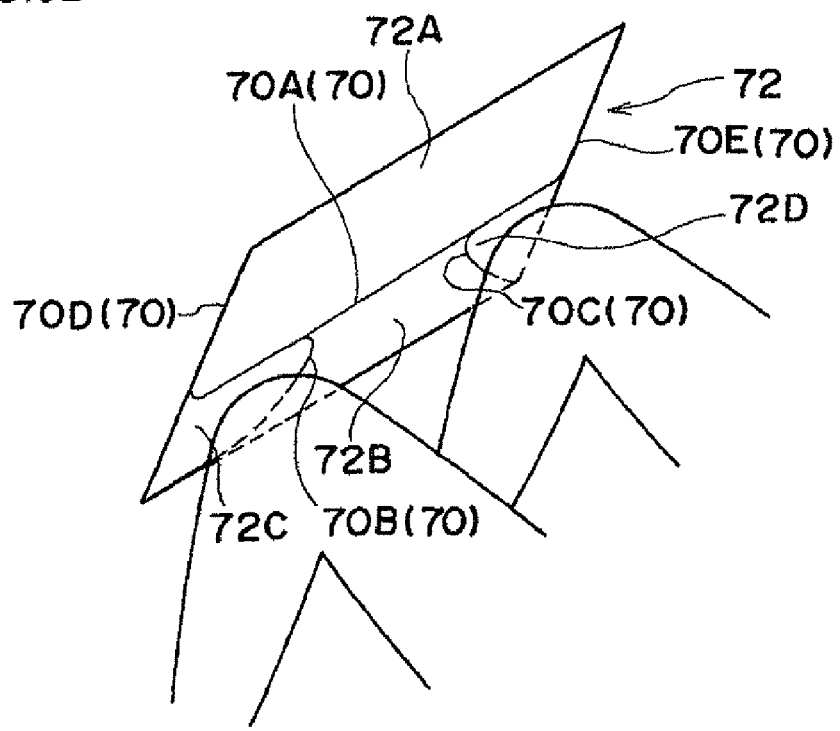
FIG. 9B is a schematic perspective view showing the position of the knees of a vehicle occupant of a small build, in relation to the air bag doors.
Figure 10A:
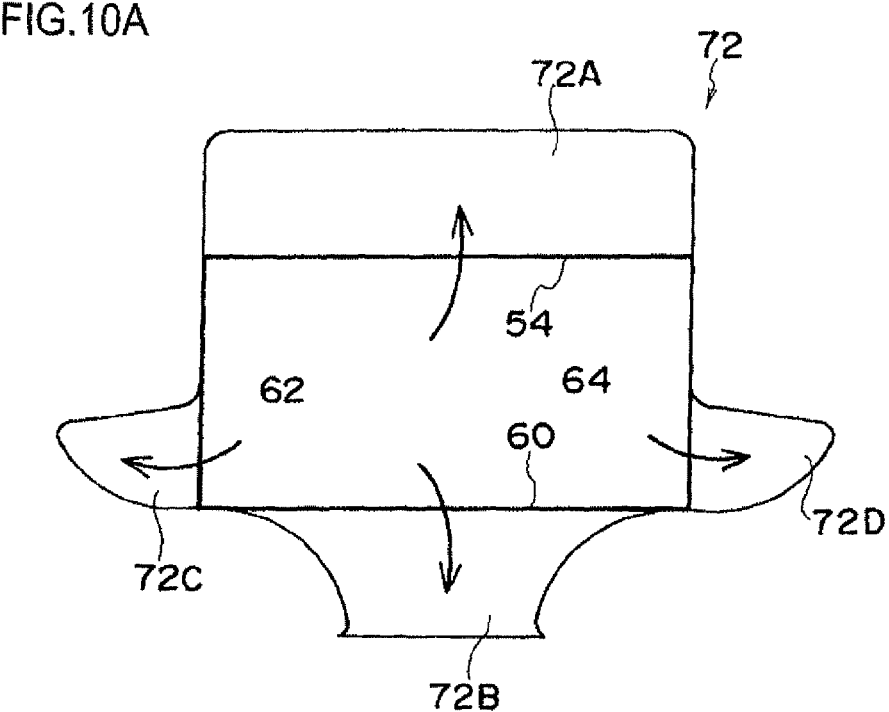
FIG. 10A is a schematic view (front view) showing an unfolded state of the air bag doors.
Figure 10B:
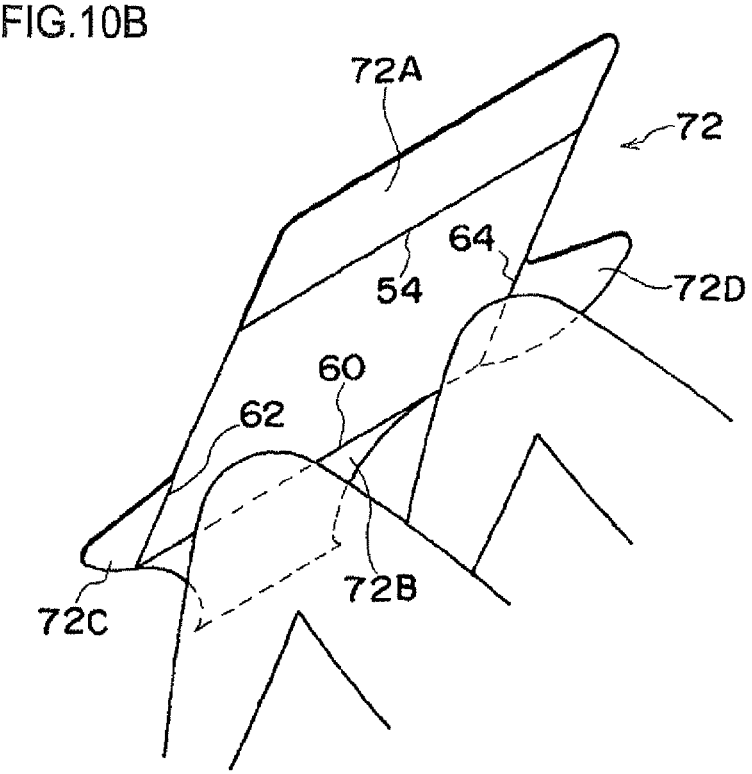
FIG. 10B is a schematic perspective view showing the position of the knees of a vehicle occupant of a small build, in relation to the air bag doors.

In the case of this example, as can be understood from a comparison of FIG. 9A, FIG. 9B that show the state before air bag door unfolding and FIG. 10A, FIG. 10B that show the state after air bag door unfolding, in the initial stage of unfolding of the air bag door 72, the upper portion air bag door 72A whose opening surface area is large and the lower central air bag door 72B whose opening surface area is somewhat small open smoothly and rapidly, and from there, the knee air bag 46 is expanded and unfolded rapidly, and then the lower left air bag door 72C and the lower right air bag door 72D unfold leftward and rightward so as to pass out through from between the instrument panel 10 and the knees of the vehicle occupant, and the unfolded state of the knee air bag 46 is complete. Note that the states of unfolding of the lower left air bag door 72C and the lower right air bag door 72D are the same as the contents described by using FIG. 4 in the above-described first embodiment.

In this way, in accordance with the present embodiment as well, in addition to obtaining operation and effects that are similar to the above-described first embodiment, the effect that the unfolding performance of the air bag door 72 can be tuned easily by adjusting the offset amount δ of the lateral direction fracture portion 70A, is obtained.

Note that, in the above-described embodiment, the upper portion side of the air bag door 72 is structured as an air bag door that is one door and is not divided, but the present invention is not limited to the same, and the upper portion side may be structured by three doors as in the first embodiment, or may be structure by some other plural number of doors.

[Supplementary Explanation of the Above-Described Embodiments]

(1) In the above-described present embodiment, explanation is given with the glove compartment door built-in-type knee air bag device 40 operating at the time of a front collision, but the present invention is not limited to the same, and may operate a glove compartment door built-in-type knee air bag device in a case in which a collision predicting means such as a pre-crash sensor or the like is installed in a vehicle and collision is predicted by the collision predicting means. Namely, in addition to the time of an actual collision being included, the time of predicting a collision as well is included in the "at the time of a collision" in the first aspect.

(2) To supplementarily explain the term "built-in" in the case of the glove compartment door built-in-type knee air bag device 40 relating to the present embodiment, there is no need for all of the main structural elements of the knee air bag device to be disposed at the interior of the glove compartment door 20, and if at least the knee air bag is disposed at the interior of the glove compartment door, it is included in "built-in". Accordingly, upon communicating the inflator and the knee air bag by a communicating means such as a hose or the like as described above, the inflator may be provided at the glove compartment main body 16, or may be provided at the instrument panel 10, or may be provided at a body such as an instrument panel reinforcement or the like, or may be provided at an equipment or device such as an air conditioning unit or the like.

The invention claimed is:

1. A knee air bag device for a vehicle comprising:
   an air bag module structured to include a knee air bag that, at non-collision times, is in a folded-up state, and, at the time of a collision, is expanded and unfolded toward knees of a vehicle occupant; and
   a glove compartment door that opens and closes a glove compartment main body provided at a predetermined position of an instrument panel, and that houses the air bag module at an interior of the glove compartment door,
   wherein a glove compartment door outer that is disposed at a vehicle cabin inner side of the glove compartment door is structured to include a lower door structured by a pair of lower-side side doors that are disposed at both outer sides in a glove compartment door transverse direction and unfold leftward and rightward, and a lower central door disposed between the pair of lower-side side doors and formed from one door, and an upper door structured by three doors that are a pair of upper-side side doors that are disposed above the lower door at both outer sides in the glove compartment door transverse direction and unfold in left and right directions, and an upper central door disposed between the pair of upper-side side doors and formed from one door, or an upper door that is structured by one upper portion door, and, due to a predetermined bag expanding pressure being applied, the glove compartment door outer fractures from a fracture portion and unfolds upward, downward, leftward and rightward, and when, in a state in which a vehicle occupant of a small build is seated, knees of the vehicle occupant are near to or are abutting the pair of lower-side side doors, an opening surface area of the lower central door in an initial stage of unfolding of air bag doors is set to be smaller than an opening surface area of the upper door in the initial stage of unfolding of the air bag doors.

2. The knee air bag device for a vehicle of claim 1, wherein the fracture portion is structured to include a lateral direction fracture portion that extends in the glove compartment door transverse direction in order to unfold the air bag doors upward and downward, and a pair of left and right vertical direction fracture portions that extend from a midway region of the lateral direction fracture portion toward a lower side of the glove compartment door in order to unfold the pair of lower-side side doors leftward and rightward at the both outer sides of the lower door.

3. The knee air bag device for a vehicle of claim 2, wherein the lateral direction fracture portion is disposed so as to be offset further toward a door lower side than a vertical direction central position of the air bag doors.

4. The knee air bag device for a vehicle of claim 2, wherein the vertical direction fracture portions are set so as to have line symmetry with respect to the lateral direction fracture portion, and the air bag doors are structured altogether by six doors.

5. The knee air bag device for a vehicle of claim 2, wherein the fracture portion is structured by a lateral direction fracture portion that is formed along a vehicle transverse direction, and a pair of left and right vertical direction fracture portions that are formed in substantially semicircular shapes so as to intersect at two places that are toward a center of the lateral direction fracture portion.

6. The knee air bag device for a vehicle of claim 2, wherein the fracture portion is structured by a lateral direction fracture portion that is formed along a vehicle transverse direction, a pair of left and right lower vertical direction fracture portions that are formed in substantially arcuate shapes toward a lower portion side of the air bag doors from two places that are toward a center of the lateral direction fracture portion, and a pair of left and right upper vertical direction fracture portions that extend from both end portions of the lateral direction fracture portion toward an upper portion side of the air bag doors.

7. The knee air bag device for a vehicle of claim 1, wherein the glove compartment door is disposed at a position facing knees of a vehicle occupant in a seated state, and the air bag module is housed within the glove compartment door.

8. The knee air bag device for a vehicle of claim 1, wherein a length, in the glove compartment door transverse direction, of the lower door is set such that the lower door enters-in between both knees of a vehicle occupant of a small build at a time of unfolding of the air bag doors.

* * * * *